United States Patent [19]

McGee

[11] Patent Number: 5,321,094
[45] Date of Patent: Jun. 14, 1994

[54] MODIFIED OLEFIN POLYMERS

[75] Inventor: Amanda E. McGee, Redcar, United Kingdom

[73] Assignee: Imperial Chemical Industries PLC, London, England

[21] Appl. No.: 70,322

[22] PCT Filed: Oct. 1, 1992

[86] PCT No.: PCT/GB92/01805
§ 371 Date: Jul. 28, 1993
§ 102(e) Date: Jul. 28, 1993

[87] PCT Pub. No.: WO93/07185
PCT Pub. Date: Apr. 15, 1993

[30] Foreign Application Priority Data

Oct. 1, 1991 [GB] United Kingdom ............ 9120773

[51] Int. Cl.$^5$ .................................. C08F 8/06
[52] U.S. Cl. ...................... 525/387; 525/331.7; 525/332.1; 525/332.8; 525/333.8; 525/383; 525/388
[58] Field of Search ............. 525/383, 387, 388

[56] References Cited

U.S. PATENT DOCUMENTS 3,857,826 12/1974 Greene et al. .
3,949,018 4/1976 Ayouri et al. .................. 525/332.1
4,131,653 12/1978 Hsieh et al. .................... 525/332.1
4,923,931 5/1990 Pennington et al. ............ 525/332.1
5,191,027 3/1993 Fujiwa et al. ................... 525/332.1

FOREIGN PATENT DOCUMENTS 295026 12/1988 European Pat. Off. .
400159 12/1990 European Pat. Off. .
415749 3/1991 European Pat. Off. .
423363 4/1991 European Pat. Off. .

*Primary Examiner*—Bernard Lipman
*Attorney, Agent, or Firm*—Cushman, Darby & Cushman

[57] ABSTRACT

Chemically modified olefin polymers are made by reacting solid particles of ethylenically unsaturated olefin polymer with an oxy-addition agent in a compatible non-solvent liquid. The liquid is one which wets the polymer but does not dissolve or soften it. The polymer is particularly polypropylene and especially substantially isotactic and thermoplastic unsaturated polypropylene. The oxy-addition agent is particularly an epoxidizing agent such as hydrogen peroxide or a percarboxylic acid. Useful modified polymers include epoxidized polyolefins which are more polar than the parent polyolefins and can be used as intermediates in making other derivatives such as diols, ethers and esters.

10 Claims, No Drawings

MODIFIED OLEFIN POLYMERS

This invention relates to the manufacture of modified olefin polymers, in particular modified polypropylene polymers.

Polyolefins are a well known class of thermoplastic polymers of moderate strength and toughness (as compared with modern so-called "engineering polymers") and good chemical resistance; their relative inertness arising largely from their near paraffinic structures. Often this inertness is an asset, for example in piping for gas, water etc., or when used in lining chemical reactors, but for some uses it can be a disadvantage. Thus, it is difficult to cross link the polymers to increase strength, stiffness and temperature resistance, in a controlled manner, or to modify the polymer surface to make it more receptive or reactive to dyestuffs.

One way of making such polymers more reactive so that cross-linking or surface modification can be carried out in a controlled manner is to copolymerise into the polymer a monomer that provides a site for subsequent reaction. A significant part of this line of development has been by way of the synthesis of polyolefins, particularly polypropylene, using commonomers that introduce unsaturation into the molecule, usually in side chains. Examples of syntheses that follow this approach include those described in U.S. Pat. No. 4,606,077, European Published Applications Nos. 01710285 A and 0311299 A, PCT Application No. 90-12818 A, Japanese published Applications Nos. 02-051512 A and 02-145611 A and the article by G. Gechin and T. Simonazzi in Macromolecular Preprints 1989.

The unsaturation in the polymer can be used as a site for further reaction, and, if it is the side chain that is unsaturated, or if the unsaturation is only at the end(s) of the polymer chain, the further reaction is unlikely to result in cleavage of the main chain. Cleavage, would reduce the molecular weight in an uncontrolled manner with a corresponding adverse effect on the physical, especially mechanical, properties of the polymer. However, the relatively insert nature of olefin polymers makes such farther reaction awkward to carry out. Usually, in prior proposals, the polymer is dissolved, reacted in solution and the product subsequently isolated by evaporating the solvent. Typically toluene or other similar potent solvent has been used, if necessary, at elevated temperature to ensure solution of the polymer. Such methods are satisfactory in small scale laboratory preparations but are not suitable for large scale manufacture. The present invention adopts a different approach to the further reaction in that the reaction with the unsaturated polymer is carried out in a liquid medium which is compatible with but not a solvent for the polymer (or the modified polymer product). This makes separation of the liquid medium from the reaction product much easier and more straight forward than when solvents are used.

Accordingly the present invention provides a method of making a chemically modified olefin polymer which comprises dispersing solid particles of an ethylenically unsaturated olefin polymer in a liquid medium which is a compatible non-solvent for the unsaturated polymer; reacting the unsaturated polymer with an oxy-addition agent, particularly one which does not leave significant reactive residues and especially an epoxidising agent, in the liquid medium; and recovering the chemically modified polymer.

The polymers used as starting materials in this invention are unsaturated polyolefins. As the unsaturation is used to introduce functionality into the polymer rather than being itself the source of desired properties (as in diene rubbers) the bulk of the units in the unsaturated polyolefin are derived from mono-olefins which are usually alpha-olefins typically having from 2 to 10 carbon atoms. Where the predominant alpha-olefin units are derived from monomers other than ethylene, the polymer is desirably substantially isotactic. Isotactic olefin polymers are typically thermoplastic and this invention is particularly directed to the production of chemically modified thermo-plastic olefin polymers. In particular, the invention is applicable to the manufacture of chemically modified polypropylene, especially substantially isotactic and thermoplastic polypropylene, and correspondingly the starting material for such modified polypropylene is an unsaturated polypropylene. This invention particularly includes a method of making a chemically modified polypropylene which comprises dispersing solid particles of an ethylenically unsaturated, particularly a substantially isotactic and thermoplastic, poly-propylene in a liquid medium which is a compatible non-solvent for the unsaturated polypropylene: reacting the unsaturated polypropylene with an oxy-addition agent, particularly one which does not leave significant reactive residues and especially an epoxidising agent in the liquid medium; and recovering the chemically modified polypropylene.

In the unsaturated olefin polymer, it is particularly desirable that the unsaturation does not lie in the main polymer chain remote from the ends of the chain. As is noted above, attempts at modification of such polymers can readily lead to chain cleavage. Thus, if the monomers used to synthesise the unsaturated polymer include significant amounts of conjugated di- or higher olefins such as 1,4-butadiene care may be needed to avoid generating polymers with unsaturation in the polymer chain. One particularly useful way to introduce unsaturation into the polymer is to copolymerize the olefin monomer(s) with a diene (polyene) having one alpha-olefinic double bond and having one (or more) other double bond(s) (desirably not conjugated with the alpha-olefin double bond) which does not polymerised under the olefin polymerisation conditions used (see below). Typically the carbon atoms of the other double bond(s) is (are) bound to 3 or 4 further carbon atoms vis:

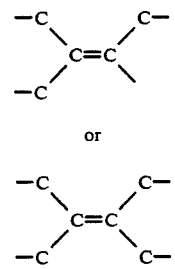

Examples of such unsaturated polymers and their synthesis are described in Japanese published Applications Nos. 02-051512 A and 02-145611 A and PCT application No WO 91/18030 (PCT/GB91/00762). These polymers have unsaturation randomly (statistically) distributed along the polymer chain but situated in side chains. Another way to synthesise unsaturated polymers, especially polypropylene, is to conduct the polymerisation using a catalyst that generates unsaturation at the end of the polymer chain during chain transfer. For Example, isotactic polypropylene synthesised using a stereorigid zirconocene and alkyl aluminoxane catalyst system in a bulk (liquid propylene) polymerisation can have terminal unsaturation as a result of beta-hydride elimination in chain transfer. This general type of polymer is described by R. Mulhaupt and T. Dushek, Preprint from III European Federation Symposium on Polymeric materials, Sorrento, Oct. 1st to 5to 1990.

The unsaturated olefin polymer will, typically, have a minimum unsaturation of 0.025 mmol (C=C).(g polymer)$^{-1}$ as lower levels of unsaturation do not generally give, after reaction, modified products having properties significantly different from those of unmodified or saturated (but otherwise equivalent) olefin polymers. This level corresponds to a (calculated) Iodine No. of about 6 [mg $I_2$.(g polymer)$^{-1}$]. Where the unsaturation is introduced into a polypropylene chain by copolymerising propylene with an alpha-olefin/other olefin diene, such dienes typically have molecular weights (as monomers) of about 125, and for such monomers this lower limit corresponds to a level of about 0.1 mole % of diene monomer units in the polypropylene. More usually the unsaturation will be at least 0.12 mmol (C=C).(g polymer)$^{-1}$ (Iodine No. about 30). The level of unsaturation will not normally exceed about 4, and not usually 3, mmol (C=C).(g polymer)$^{-1}$ (Iodine No. about 1000) as such polymers tend to give products with excessive modification. Particularly useful levels of unsaturation are in the range 0.02 to 2.5, especially 0.1 to 1, mmol (C=C).(g polymer)$^{-1}$.

To maximise contact between the unsaturated olefin polymer and the oxy-addition agent in the liquid medium it is desirable that the polymer has a high specific surface area. This can be obtained either by the unsaturated polymer having small particles or being porous with pores large enough to admit the liquid medium. Typically, the effective surface area will be at least 0.5 m$^2$.g$^{-1}$ and more usually at least 1 m$^2$.g$^{-1}$. Unsaturated polypropylene having unsaturation in side chains made by copolymerising propylene and a suitable diene (see above), in a gas phase, bulk (liquid propylene) or diluent process using conventional high stereospecificity titanium (IV) catalysts on MgCl$_2$ supports are, as ex-reactor materials, typically porous particles having an overall average size (calculated as the diameter of spheres of volume equal to the particle volume) of about 0.3 to 2 mm and a porosity of 5 to 30% by volume giving an effective specific surface area of 5 to 15 m$^2$.g$^{-1}$. Similarly, unsaturated polypropylene, having chain terminal unsaturation made by a process including hydride eliminating chain transfer, (see above), typically takes the ex-reactor form of a very fine powder e.g. having an average particle size of about 1 $\mu$m having a specific surface area of about 5 to 10 m$^2$.g$^{-1}$. Such materials can be readily reacted according to the invention.

The liquid medium used in the reaction with the unsaturated olefin polymer is a compatible non-solvent for the polymer. A compatible medium is one which thoroughly wets the polymer and, where the polymer is porous, penetrates the pores, under the conditions of the reaction. The liquid medium is a non-solvent for the unsaturated polymer in that it does not dissolve the polymer nor substantially soften it although it may cause the polymer particles to swell. Any swelling of the polymer by the liquid medium will be less than that which causes the polymer particles to disintegrate or soften to such an extent that they agglomerate. In other words cohesion of the polymer particles is not significantly impaired and adhesion of the polymer particles is not significantly promoted by the liquid medium. The specific choice of liquid medium will depend on the particular unsaturated olefin used, but it will be chosen from compatible non-solvents and will typically be an organic liquid (under reaction conditions) such as an aliphatic hydrocarbon, particularly an alkane; a halogenated aliphatic hydrocarbon, particularly a halo-alkane; a carboxylic acid; a ketone; an alcohol; an aromatic hydrocarbon, particularly an alkylbenzene; and mixtures of or containing such liquids. Relatively reactive liquids such as ketones and alcohols can react with the epoxy forming reagent or the modified polymer, typically to generate by products which may be undesired, if only by loss of the liquid reagent or modified polymer, and thus if used will be used with caution. Aromatic liquids such as toluene and the xylenes tend to be fairly good solvents for polyolefins, particularly polypropylenes, and if used, will be used under conditions where they are non-solvents for the polymer, typically by keeping the temperature at about or even below ambient temperature. Alkylbenzenes with longer alkyl side chains tend to be less good solvents for the polymers and it may be possible to use them at higher temperatures. The more useful liquids are among the aliphatic and halogenated aliphatic hydrocarbons and carboxylic acids. We have found that liquid alkanes such as n-heptane, chlorinate alkanes such as chloroform and carboxylic acids such as acetic acid can be used as the liquid reaction medium. Halogenated liquids such as chloroform may cause the polymer to swell, but in our experience this does not go so far as to excessively soften the polymer so as to approach dissolving it.

The medium can include other liquids, which do not themselves wet the polymer, in admixture with a compatible liquid provided that the mixture or a component of the mixture does wet the unsaturated polymer to enable efficient reaction with the epoxy forming reagent. The most usual such other liquid will be water either, where it is miscible, mixed with the compatible liquid e.g. acetic acid, or, where it is immiscible, as a separate phase e.g. as with chloroform or liquid alkanes.

The oxy-addition agent is an oxidising agent which adds an oxygen containing substituent to either or both the double bonded carbon atoms whist converting the double bond into a single bond without leaving reactive residues at the end of the reaction. Thus, the oxy-addition agent does not cause substantial cleavage of the double bond or of the main polymer chain. Most usually the reaction yields either an epoxide or hydroxyl substituted product groups. A convenient way of visualising the reaction of the oxy-addition agent with the double bond system is as follows:

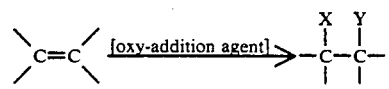

where
X is a hydroxyl group;
Y is a halogen, particularly chlorine atom or a group OR where R is a hydrogen atom, or an ether or ester residue (i.e. R is alkyl, aryl or C(O)R' where R' is alkyl or aryl [as defined for R]); or X and Y together are —O— (thus giving an epoxide group). Suitable oxy-addition agents include epoxidising agents, discussed further below, diol forming oxidising reagents, such as peroxides and hydroperoxides (which can yield the diols themselves or corresponding ether or ester with an organic residue of the reagent) or systems generating singlet oxygen species, such as aqueous hydrogen peroxide, bromine and base, and inorganic oxidising agents such as hypohalite, particularly aqueous hypochlorite. The avoidance of reactive residues at the end of the reaction effectively excludes heavy metal oxidising agents such as permanganate. Such reagents tend to leave metal oxide residues which discolour or otherwise contaminate the product and are difficult to remove. Often these residues are themselves oxidants or pro-oxidant materials as with permanganate which leaves residual manganese dioxide. Such residues adversely affect the stability of products formed from the modified polymers and may interfere with subsequent desired reactions.

As is mentioned above, epoxidising agents are particularly desirable oxy-addition agents in the invention. Epoxidising agents are oxy-addition agents which can convert ethylenic double bonds in the unsaturated olefin polymer into epoxide groups. The most important group of epoxidising agents are peroxy compounds including hydrogen peroxide and, particularly, percarboxylic acids and their salts. Examples include peralkanoic acids e.g. peracetic acid, peraromatic acids e.g. m-chloroperbenzoic acid (MCPBA) and salts of such acids e.g. monomagnesium peroxyphthalate (MMPP). Percarboxylic acids are particularly useful epoxidising agents because they can yield a high yield of epoxide groups with only slight (and possible no) formation of by products. Other peroxy compounds, including hydrogen peroxide, are generally less specific and typically give rise to by products such as diol groups, which are probably formed by ring opening of epoxide groups, methylene groups believed to be formed by dehydration of a diol OH group and an adjacent methyl group, or other derived products such as ethers or esters which can be formed by reaction of epoxy groups with alcohols or carboxylic acids present in the reaction medium, for example in or as the compatible non-solvent. The non-specific epoxidising agents can be considered as diol forming agents referred to above.

Although percarboxylic acids are available as pure compounds, they are more easily handled as, and 'commercial' grade materials are usually, a mixture with or a solution in the corresponding carboxylic acid often also mixed with water and/or mineral acid and/or hydrogen peroxide. Where the corresponding carboxylic acid can be a compatible non-solvent for the polymer, the 'commercial' grade percarboxylic acid can act as its own reaction medium. In practice the epoxidising agent and the compatible non-solvent will be chosen so that the epoxidising agent is sufficiently soluble to facilitate reaction with the unsaturated polymer.

The amount of epoxidising agent used will normally be at least stoichiometrically equivalent to the double bonds to be reacted in the polymer and typically a convenient excess will be used to speed the reaction. We have not found it necessary to use more than twice the stoichiometric requirement and have obtained best results using amounts in the range 105 to 130% of the stoichiometric requirement.

The reaction between the unsaturated olefin polymer and the epoxy-forming reagent proceeds over a wide range of temperatures. We believe that the limits are set primarily by the freezing and boiling points of the liquid medium (or possibly by the melting point of the polymer) other than the reaction itself. Generally the temperature will be within the range $-50°$ C. to $100°$ C. more usually at least ambient temperature (about 20° C.) and particularly 40° to 90° C. Generally, the reaction runs more quickly at higher temperatures but higher temperatures may encourage further reaction of epoxide groups and/or lead to crosslinking of the polymer.

Where the oxidising agent used is an epoxidising agent, we believe that the initial reaction in the invention is the conversion of ethylenic double bonds in the unsaturated olefin polymer into epoxide groups:

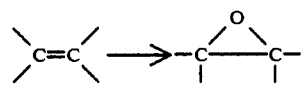

The initially formed epoxide can react with a variety of materials which may be present in the reaction mixture to give hydroxylic and/or ether and/or ester group containing materials:

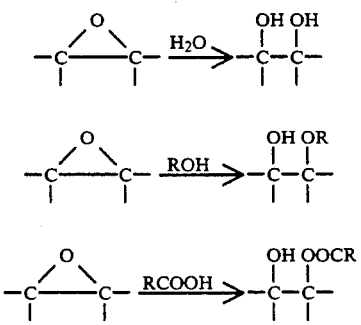

where R is an alkyl or aryl group. Further where the double bond has an adjacent methyl group, the following sequence generating a 3-hydroxyprop-1-enyl group may occur:

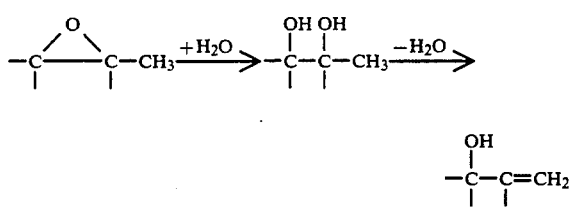

Where the epoxide group in the polymer is specifically desired, as for example the reactive site for a specific further reaction, then these side reactions are undesired because they remove epoxide groups from the polymer. In many cases, however, the purpose of epoxidising the polymer is to introduce polar groups into the polymer, the hydroxyl, oxyether or acyl groups introduced by the 'side' reactions may be the same as or equivalent to desired groupings from epoxide ring opening reactions.

In such cases the side reactions may not be disadvantageous.

A variety of subsequent reactions with epoxide groups in the modified polymers produced in this invention is possible. As well as the reactions identified above as 'side' reactions but conducted deliberately, the following outline schemes illustrate the possibilities.

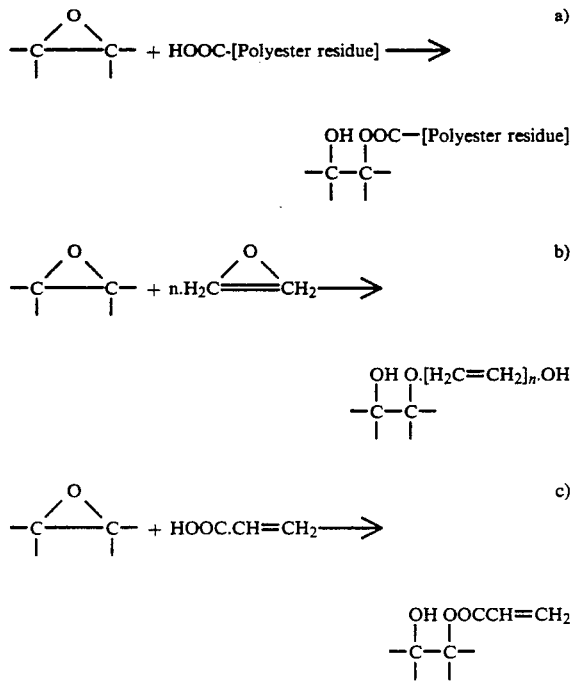

Of these, a and b illustrate graft polymerisation and c the introduction of a reactive double bond that could be used to cross link the polymer.

Similar reactions are possible with modified polymers including groups such as:

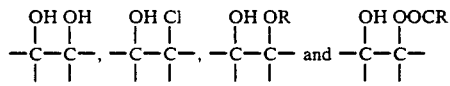

where R is alkyl or aryl, which are generated from epoxy groups or made directly in the reaction between the oxy-addition agent and the unsaturated olefin polymer. Generally, the reactions with these species run more slowly than with epoxy groups.

The process of the invention can be used to make polymer which, on their own or blended with other polymer, especially with unmodified polyolefins or polyesters, particularly the materials generated by reaction sequence a) above, have a variety of practically useful properties. The introduction of polar, particularly hydrophilic groups, into the polymer can enhance the receptivity towards dyestuffs, with applications in films and fibres, towards paints and inks, especially printing inks, with applications in films such as packaging films, and surface coatings, as compatibilisers in blends, particularly by grafting suitable oligomeric units onto the olefin polymer using the epoxide function, as in blends of polyolefins and polyesters compatibilised with materials generated by reaction sequence a) above, to produce polymers with novel or exotic rheological properties, and, in the form or porous particles, as the basis for interpenetrating network microstructures linked through the epoxide function.

The following Examples illustrate the invention. All parts and percentages are by weight unless otherwise stated.

Materials and Abbreviations

MOCD—7-methyl-1,6-octadiene (from Shell Chemicals Limited) hydrogen peroxide ($H_2O_2$) aqueous solution containing 30% $H_2O_2$ (about 9.7M $H_2O_2$)

AcOOH—reagent grade material containing about 30% peracetic acid, about 30% acetic acid, 3% hydrogen peroxide, 2% sulphuric acid remainder (about 33%) water (about 4.4M peracid and 6M total peroxide). Available from Aldrich or Interox.

n-AcOOH—AcOOH with the sulphuric acid neutralised by the addition of sodium hydroxide (pH ca 4).

m-CPBA—reagent grade m-chloroperbenzoic acid containing 55 to 60% peracid (molar amounts quoted are approximated based on 57.5% peracid).

MMPP—reagent grade monomagnesium peroxyphthalate hexahydrate (nominally 100% material).

AcOH—glacial acetic acid

IPA—isopropyl alcohol

EC 180—is an aliphatic hydrocarbon diluent consisting essentially of dodecane isomers and having a boiling point in the range 170° to 180° C. It is used from a stock stored under dry nitrogen sparging to keep it free from water and oxygen.

Analysis and Test methods

The degree of unsaturation of propylene/MOCD copolymers was calculated from $^1H$ nmr analysis of the copolymer (in solution). The integration of -CH=C< protons as a proportion of that of other aliphatic protons, together with knowledge of the structure of the monomers (in particular the number of hydrogen atoms they contain) permits the calculation of the proportion of diene monomer derived units in the copolymer (for binary polymers). The degree of unsaturation is quoted as mole % MOCD residues or as mmol double bond per gram of polymer.

$^1H$ nmr was carried out on polymer samples dissolved in TCE at 100° C. on a GSX 400 nmr spectrometer at 400 MHz using TMS as internal standard. Quantitative data were calculated by a similar method to the 'degree of unsaturation' calculations (see above) but using the appropriate nmr peaks. Results are quoted as mol % of MOCD derived residues containing the identified groups.

IR was carried out on 40 to 80 μm thick film samples pressed from polymer powder, on a Perkin Elmer 1600 series FTIR spectrometer. Quantitative data for epoxide groups were obtained from a peak at about 1125 $cm^{-1}$ by normalising the spectra of epoxidised and non-epoxidised polymers to match peaks common to both spectra so far as possible. The peak height of the 'epoxide' peak (at about 1125 $cm^{-1}$) was taken as a percentage (in transmission mode). This value corresponded to about 1.5 times the value of mole % epoxide obtained from measurements on epoxide protons by nmr. The result obtained from IR measurements is quoted as 'mole % epoxide(IR)' (without normalisation against the nmr figure).

Melt Flow Index (MFI) was measured according to ASTM-D 1328-N (using the 190/10 scale). Results are quoted in g. (10 min)$^{-1}$.

Melting Point (m.p.) was measured on a hot stage microscope with the melting point judged by eye. Results are quoted in °C.

Crosslinking was assessed as insolubles in a hydrocarbon solvent (EC180—a $C_{12}$ alkane fraction). About 3 g of polymer was stirred with EC180 at 130° C. to dissolve the bulk of the polymer. The remaining solid was separated in a warmed glass sinter which was then extracted for 6 hours in a soxhlet apparatus using boiling EC180 as the solvent. The degree of crosslinking is assessed as the weight % of the polymer remaining undissolved.

Flexural Modulus (FM) was measured according to ISO 178. Results are quoted in GPa.

Dye Pen test Samples of film pressed as for IR spectra were marked with a 'Politest' dye test pen (from Lorilleux International of Spain) and the marked film was visually assessed on a ranking scale A to E (A—most dye adhered, E—least dye adhered).

Foil Stick test During preparation of plaque samples for FM testing the polymer was pressed into a plaque against aluminium foil liners. The difficulty of removing the foil from the plaque was assessed qualitatively with the results expressed as a ranking order (among the samples tested) lowest rank indicating most sticking.

Synthesis of polymers

Propylene/MOCD copolymers

These copolymers were made by the method described below (the method of Example SE5 in our PCT Application No. PCT/GB91/00762). The unsaturated copolymers of propylene and MOCD were made using a diluent polymerisation technique in a pilot scale autoclave reactor.

This reactor is a nominal 5 liter stainless steel pilot scale autoclave having a heating jacket operated to control the temperature of the contents of the autoclave. The reactor is fitted with a mechanical stirrer, temperature and pressure sensors, vacuum, nitrogen and hydrogen gas and propylene gas, supply lines and a valved port to enable the addition of other reaction components. In operation the autoclave is thoroughly dried, sealed and purged with nitrogen. The hydrocarbon diluent, diene monomer, prepolymerised catalyst, aluminium triethyl co-catalyst and silane are introduced through the valved port and the valve closed. The stirrer is started and propylene is added and the propylene line is then closed. Gaseous hydrogen is supplied to the reactor to give a pre-determined hydrogen partial pressure at the start of polymerisation. At the end of the polymerisation, the reactor is vented to reduce the pressure to ambient and the autoclave is unsealed to recover the polymer.

The catalyst used is a slurry of a conventional magnesium chloride supported titanium, high stereospecificity Ziegler-Natta olefin polymerisation catalyst made as follows. Solid magnesium chloride is treated with ethanol to give a haloethanolate (probably magnesium chloride with ethanol of crystallisation) which is dispersed in hot EC180 and spray quenched into cold EC180. The magnesium haloethanolate slurry is treated with $TiCl_4$ (about 6 g per g of the magnesium halo ethanolate) and heated to 110°–120° C. Di-isobutylphthalate is added as internal electron donor (about 14 g per g of the magnesium haloethanolate). The mixture is allowed to settle and the supernatant liquid is discarded. The treatment with $TiCl_4$ is repeated at ca. 110° C. and excess $TiCl_4$ is then removed by repeated dilution, settling and decanting. Before use in the Examples, the catalyst is prepolymerised (with propylene) using aluminium triethyl as co-catalyst and di(lower alkyl) dimethoxy silane as external electron donor at approximate molar ratios of Al:Ti:Si of 3:1:1. The prepolymerisation is stunned with $CO_2$ when about 3 g polypropylene per g catalyst has been made.

This method can be used to produce unsaturated copolymers having a range of degree of unsaturation by varying the proportion of MOCD monomer included in the reactor. The polymer is recovered as particles having a typical average diameter of about 1 mm, a porosity of about 25% by volume and a specific surface area of about 7 g.m$^{-2}$.

Terminally unsaturated polypropylene

This polymer was produced as follows: 1,2-di(tetrahydroindenyl)ethylene zirconium chloride in solution in toluene (1 ml; 1 mg(catalyst).ml$^{-1}$(solution) was mixed with methyl aluminoxane dissolved in toluene (15 ml of 4.4M solution) and added to a stirred autoclave (3 l nominal volume) which had been thoroughly flushed with gaseous propylene at ambient pressure. Liquid propylene (3 l) was then added and the autoclave heated to 65° C. and the reaction allowed to proceed under the autogenous pressure for 90 minutes. The remaining propylene was then slowly evaporated off. The product was recovered to yield 364 g of polymer as a fine powder having a particle size of about 1 μm. This polymer had a molecular weight of about 6 kD and a degree of unsaturation of about 0.17 mmol (C=C).(g polymer)$^{-1}$ (iodine No about 42) and a specific surface area of about 7 g.m.$^{-2}$.

EXAMPLE 1 m-CPBA (1 g; ca 3.3 mmol) was dissolved in chloroform (25 ml). Propylene/MOCD copolymer powder, having a degree of unsaturation of 7.3 mol % MOCD residues, corresponding about 1.8 mmol double bond. (g polymer)$^{-1}$, (2 g; about 3.6 mmol double bond) was dispersed in the chloroform solution and left to stand at ambient temperature (ca 20° C.) for about 16 hours. The polymer product was washed thoroughly with acetone to remove the chloroform and then vacuum dried at 60° C. for 2 hours. $^1$H nmr analysis of the modified polymer product indicated that it contained about 5.7 mol % epoxidised MOCD residue, equivalent to about 1.4 mmol epoxide residues per gram of modified polymer product, and about 1.8 mol % unepoxidised MOCD residues. The infrared spectrum of the polymer product had peaks at 880, 1125 and 1248 cm$^{-1}$ absent from the spectrum of the starting copolymer.

EXAMPLE 2

Propylene/MOCD copolymer powder, having a degree of unsaturation of 2 mol % MOCD residues, corresponding to 0.48 mmol double bond. (g polymer)$^{-1}$, (20 g; about 9.6 mmol double bond) was slurried in chloroform (100 ml) with stirring. m-CPBA (3.33 g; ca 11 mmol) was added over a period of 45 minutes at ambient temperature, the slurry was stirred for a further 2½ hours, allowed to stand for about 16 hours and then thoroughly washed with acetone and dried. $^1$H nmr analysis indicated that the modified polymer product contained 1.5 mol % epoxidised MOCD residues, about 0.36 mmol(epoxide residues). (g product). The IR spectrum of the modified polymer product had a peak at 1122 cm$^{-1}$ not present in the spectrum of the starting material.

EXAMPLE 3

Sodium hydroxide (1 g) was added to stirred AcOOH (50 ml; about 2230 mmol peracid; about 300 mmol total peroxy group) at 0° C. and stirring was continued until the sodium hydroxide dissolved (about 1½ hours). Propylene/MOCD copolymer powder, having a degree of unsaturation of 7.3 mol % MOCD residue, corresponding to about 1.8 mmol double bond. (g polymer)$^{-1}$, (5 g; 9 mmol double bond) was added, the mixture was stirred for 1 hour and the modified polymer product was isolated washed with acetone and dried in a vacuum oven at 60° C. for about 16 hours. $^1$H nmr analysis of the modified polymer product indicated that it contained 1.7 mol % epoxidised MOCD residues, about 0.4 mmol epoxide (g product), and (calculated as mol % modified MOCD residues) 1.3 mol % C=CH$_2$ groups, believed to be generated by dehydration of initially formed diol groups, 2.7 mol % CHOR (where R is H or acetyl) groups, believed to be generated by ring opening reactions of epoxide groups, and 1.9 mol % unmodified MOCD residues. The IR spectrum of the modified polymer product had a peak at 1125 cm$^{-1}$ not present in the starting material and a peak at 1671 cm$^{-1}$ in the starting material was not apparent in the modified polymer product.

EXAMPLE 4

Terminally unsaturated polypropylene powder, having a number average molecular weight of about 6 kD giving about 0.1 mmol double bond, (g polymer)$^{-1}$, (50 g; 8 mmol double bond) was slurried in chloroform (100 ml). m-CPBA (5 g; 17 mmol) was added and the mixture was stirred at ambient temperature for 1 hour. The modified polymer was isolated, washed with acetone and dried. Before spectroscopic analysis the modified polymer was purified by dissolving it in hot toluene reprecipitating by cooling separating and drying. $^1$H nmr analysis of the purified modified polymer product indicated that it contained epoxide groups and unreacted double bonds together with ring opened products from epoxy groups and methylene groups although the concentration of these in the polymer is not great enough to quantify by nmr (c.f. the degree of unsaturation of the starting polymer). The IR spectrum of the reprecipitated polymer had a peak at 1166 cm$^{-1}$ not present in the spectrum of the starting material.

EXAMPLE 5

A matrix experiment including a number of runs was conducted. The following general procedure was used.

Propylene/MOCD copolymer powder, having a degree of unsaturation of 1.5 mol % MOCD residues, corresponding to about 0.34 mmol double bond. (g polymer)$^{-1}$, was dispersed with stirring in the liquid reaction medium (compatible non solvent) (100 ml) and the temperature adjusted (if necessary) to the desired reaction temperature. The epoxy forming reagent (in solution in a suitable solvent if necessary) was added gradually to the reaction mixture over a period of about 1 hour. Samples of the polymer were removed from the reaction mix at (various) intervals, washed thoroughly with acetone and then water/IPA mixture (75:25 by volume) and dried in a vacuum oven at 50° C. for 2 hours. At the end of the reaction time the remaining modified polymer was isolated and similarly washed and dried.

Information on the materials used and the reaction conditions is given in Table 1 below. In Runs 5, 8 to 13, 16 and 17, the reaction media were mixtures in the volume ratios given in Table 1. In runs 10 to 12 the epoxidising agents were solids used as solutions; m-CFBA (Runs 11 and 12) was dissolved in chloroform (6 g solid in 50 ml solvent) and the pH of the aqueous reaction phase was buffered to 4.5 to 5 by adding 1M aqueous NaOH as necessary; MMPP (run 10) was dissolved in water (50 g solid in 250 ml water) and the pH was adjusted to 5.0 using sodium hydroxide before use.

The modified polymer samples were analysed spectroscopically for epoxide group content, unmodified MOCD residues and other groups i.e. by products presumed to be from reactions including epoxide ring opening, and for crosslinking (by solubility) and the results are set out in Table 2 below.

Samples were further tested for MFI, melting point, flexural modulus and the dye pen and foil stick tests. The results are set out in Table 3 below.

TABLE 1

| Run No | Epoxy Reagent matl. | qty. | mmol perox. | Reaction Medium | Mix Ratio (by vol) | Temp (°C.) | Reaction Time (min) |
|---|---|---|---|---|---|---|---|
| 1 | H$_2$O$_2$ | 5 ml | 48.5 | AcOH | — | 25 | 90 |
| 2 | H$_2$O$_2$ | 5 ml | 48.5 | AcOH | — | 80 | 30 |
| 3 | AcOH | 5 ml | 23.5 | CHCl$_3$ | — | 50 | 1000 |
| 4 | AcOH | 5 ml | 23.5 | CHCl$_3$ | — | −40 | 1000 |
| 5 | AcOH | 5 ml | 23.5 | H$_2$O/CHCl$_3$ | 90:10 | 24 | 360 |
| 6 | AcOH | 5 ml | 23.5 | hexane | — | 4 | 360 |
| 7 | AcOH | 5 ml | 23.5 | hexane | — | 50 | 120 |
| 8 | n-AcOH | 5 ml | 23.5 | H$_2$O/CHCl$_3$ | 90:10 | 50 | 240 |
| 9 | n-AcOH | 5 ml | 23.5 | H$_2$O/CHCl$_3$ | 90:10 | 4 | 300 |
| 10 | MMPP | 50 g | 200 | H$_2$O/IPA | 75:25 | 50 | 1000 |
| 11 | m-CPBA | 6 g | 20 | H$_2$O/CHCl$_3$ | 80:20 | 25 | 300 |
| 12 | m-CPBA | 6 g | 20 | H$_2$O/CHCl$_3$ | 80:20 | 50 | 330 |
| 13 | AcOH | 5 ml | 23.5 | H$_2$O/heptane | 75:25 | 50 | 1000 |
| 14 | AcOH | 5 ml | 23.5 | heptane | — | 50 | 1000 |
| 15 | n-AcOH | 5 ml | 23.5 | hexane | — | 50 | 120 |
| 16 | AcOH | 5 ml | 23.5 | H$_2$O/hexane | 60:40 | 50 | 200 |
| 17 | n-AcOH | 5 ml | 23.5 | H$_2$O/ | 40:60 | 50 | 255 |

TABLE 1-continued

| Run No | Epoxy Reagent matl. | qty. | mmol perox. | Reaction Medium | Mix Ratio (by vol) | Temp (°C.) | Reaction Time (min) |
|---|---|---|---|---|---|---|---|
| | | | | hexane | | | |

TABLE 2

| Run No | Sample Time (min) | Epoxide (IR) (mol %) | MOCD (nmr) (mol %) | Other (nmr) (mol %) | Cross Linking (wt %) |
|---|---|---|---|---|---|
| 1 | 90 | 0 | 2.3 | 0.1 | 4.5 |
| 2 | 15 | 0 | 2.2 | 0.5 | 11.3 |
| | 30 | 0 | 1.4 | 0.7 | 12.8 |
| 3 | 50 | 0.5 | 1.1 | 1.1 | 12 |
| | 1000 | 0 | 0 | 2.2 | 58.4 |
| 4 | 180 | 0.1 | 1.8 | 1.2 | — |
| | 1000 | 2.2 | — | — | 5.6 |
| 5 | 60 | 0.5 | — | — | — |
| | 180 | 0 | 1.2 | 1.1 | — |
| | 360 | 0.6 | — | — | 1.3 |
| 6 | 60 | 0 | 2.3 | 0.4 | — |
| | 180 | 0.1 | 1.8 | 1.3 | — |
| | 360 | 0.6 | 1.6 | 1.5 | 0.3 |
| 7 | 30 | 0.5 | — | — | — |
| | 60 | 1.7 | — | — | — |
| | 120 | 2 | 0 | 1.1 | 0 |
| 8 | 30 | 0.4 | 1.8 | 0.9 | — |
| | 60 | 0.7 | 1.5 | 0.9 | — |
| | 240 | 1.5 | 0.5 | 1.8 | 0 |
| 9 | 300 | 0 | 1.5 | 1.3 | 0 |
| 10 | 1000 | 0 | 2.4 | 0.1 | 0 |
| 11 | 60 | 0.8 | 1.4 | 0.9 | — |
| | 120 | 1.3 | 0.8 | 1.4 | — |
| | 300 | 1.5 | 0.9 | 0.9 | 0 |
| 12 | 330 | 0.8 | — | — | — |
| 13 | 25 | 0 | — | — | — |
| | 50 | 0.1 | — | — | — |
| | 100 | 0.6 | — | — | — |
| | 1000 | 1.2 | — | — | — |
| 14 | 15 | 2.4 | — | — | — |
| | 70 | 2.7 | — | — | — |
| | 1000 | 2 | — | — | — |
| 15 | 30 | 0.8 | — | — | — |
| | 60 | 1.8 | — | — | — |
| | 120 | 1.8 | — | — | — |
| 16 | 30 | 0 | — | — | — |
| | 60 | 0.2 | — | — | — |
| | 120 | 1 | — | — | — |
| 17 | 255 | — | — | — | — |

TABLE 3

| Run No | Sample Time (min) | MFI (g.min$^{-1}$) | m.p. (°C.) | FM (GPa) | Dye Pen | Foil Stick |
|---|---|---|---|---|---|---|
| 1 | 90 | 48 | 175 | 0.99 | D | 2 |
| 2 | 30 | 29.5 | 180 | 1 | D | 3 |
| 3 | 1000 | 2.8 | 185 | 0.58 | B | 11 |
| 4 | 1000 | 58 | 175 | 1.1 | C | 5 |
| 5 | 360 | 84.5 | 145 | 1.06 | C | 7 |
| 6 | 360 | 85.5 | 145 | 1.05 | C | 6 |
| 7 | 120 | 91 | 140 | 1.06 | B | 10 |
| 8 | 240 | 93 | 140 | 1.06 | C | 9 |
| 9 | 300 | 91 | 140 | 1.04 | C | 8 |
| 10 | 1000 | 86.5 | 145 | 1.04 | D | 1 |
| 11 | 300 | 117 | 145 | 1.1 | D | 4 |
| 12 | 330 | 83.2 | — | — | C/D | — |
| 13 | 1000 | 90.3 | — | — | C | — |
| 14 | 1000 | 91.7 | — | — | B | — |
| 15 | 30 | 90.3 | — | — | C | — |
| | 60 | 93.4 | — | — | C | — |
| | 120 | 94.5 | — | — | B | — |
| 16 | 200 | 92.4 | — | — | B | — |
| 17 | 255 | 89.4 | — | — | — | — |

I claim:

1. A method of making a chemically modified olefin polymer which comprises dispersing solid particles of an ethylenically unsaturated olefin polymer in a liquid medium which is a compatible non-solvent for the unsaturated polymer; reacting the unsaturated polymer with an oxy-addition agent in the liquid medium; and recovering the chemically modified polymer.

2. A method as claimed in claim 1 wherein the oxy-addition agent is an epoxidising agent.

3. A method as claimed in claim 2 wherein the epoxidising agent is hydrogen peroxide, a percarboxylic acid or a mixture of these.

4. A method as claimed in claim 1 wherein the ethylenically unsaturated olefin polymer is substantially isotactic and thermoplastic unsaturated polypropylene.

5. A method as claimed in claim 1 wherein the ethylenically unsaturated olefin polymer has a level of unsaturation of from 0.025 to 3 mmol(C=C).(g polymer)$^{-1}$.

6. A method as claimed in claim 5 wherein the ethylenically unsaturated olefin polymer has a level of unsaturation of from 0.1 to 1 mmol(C=C).(g polymer)$^{-1}$.

7. A method as claimed in claim 1 wherein the ethylenically unsaturated olefin polymer has a specific surface area of at least 1 m$^2$.g$^{-1}$.

8. A method as claimed in claim 1 wherein the liquid medium is a compatible non-solvent selected from aliphatic hydrocarbons; halogenated aliphatic hydrocarbons; carboxylic acids; ketones; alcohols; aromatic hydrocarbons; and mixtures of or containing such liquids.

9. A method as claimed in claim 1 wherein the liquid medium is a compatible non-solvent selected from alkanes; halo-alkanes; alkylbenzenes; and mixtures of or containing such liquids.

10. A method of making a chemically modified polypropylene which comprises dispersing solid particles of a substantially isotactic and thermoplastic, ethylenically unsaturated polypropylene in a liquid medium which is a compatible non-solvent for the unsaturated polypropylene; reacting the unsaturated polypropylene with an epoxidising agent in the liquid medium; and recovering the chemically modified polypropylene.

* * * * *